United States Patent
Bastone, Jr.

(10) Patent No.: US 9,560,835 B1
(45) Date of Patent: Feb. 7, 2017

(54) PORTABLE LIQUID PACKAGE AND DISPENSING METHOD FOR ANIMALS

(71) Applicant: Frank A. Bastone, Jr., Newburgh, NY (US)

(72) Inventor: Frank A. Bastone, Jr., Newburgh, NY (US)

( * ) Notice: Subject to any disclaimer, the term of this patent is extended or adjusted under 35 U.S.C. 154(b) by 170 days.

(21) Appl. No.: 14/300,196

(22) Filed: Jun. 9, 2014

Related U.S. Application Data

(62) Division of application No. 13/441,763, filed on Apr. 6, 2012, now abandoned.

(51) Int. Cl.
  *A01K 5/01* (2006.01)
  *A01K 7/00* (2006.01)
  *B65B 3/04* (2006.01)
  *A01K 5/00* (2006.01)

(52) U.S. Cl.
  CPC .............. *A01K 7/005* (2013.01); *A01K 5/00* (2013.01); *B65B 3/04* (2013.01)

(58) Field of Classification Search
  CPC ............ A01K 7/005; A01K 5/00; B65B 3/04; B65B 3/00
  USPC ....................................................... 119/61.5
  See application file for complete search history.

(56) References Cited

U.S. PATENT DOCUMENTS

| | | | | |
|---|---|---|---|---|
| 2,779,462 A * | 1/1957 | Hoag | ..................... | B65D 75/20 206/217 |
| 3,341,108 A * | 9/1967 | Kirk | ................... | B65D 75/5805 206/484 |
| 4,837,849 A * | 6/1989 | Erickson | ............. | B29C 65/7437 383/104 |
| 4,869,912 A * | 9/1989 | McCoy | .................... | A61J 9/001 215/11.3 |
| 6,245,367 B1 * | 6/2001 | Galomb | ............... | B65D 51/247 206/541 |
| 6,254,907 B1 * | 7/2001 | Galomb | ............... | B65D 51/247 206/541 |
| 6,488,146 B1 * | 12/2002 | Dotsikas | ............... | A61J 7/0046 206/217 |
| 7,658,542 B2 * | 2/2010 | Risgalla | ............. | B65D 75/5822 383/200 |
| 8,858,077 B2 * | 10/2014 | Shepard | ................. | B65D 31/10 383/203 |
| 9,010,565 B2 * | 4/2015 | Warner | .................... | A01K 7/00 206/545 |
| 2004/0131286 A1 * | 7/2004 | Rosen | ................ | B65D 75/5811 383/209 |

(Continued)

*Primary Examiner* — Kristen C Hayes
(74) *Attorney, Agent, or Firm* — Calhelha & Doyle LLC

(57) ABSTRACT

A portable pouch suitable for both transporting and serving water or beverages to animals is provided. The pouch is sealed to contain and protect the liquid during transport. Such sealed pouches will lay in a generally flat configuration for shipping and storage. Generally, a resealable zip closure is provided at the top of the pouch for later re-use. When the liquid-filled pouch is opened for use, a specially gusseted bottom panel also opens in a generally round and flat orientation to provide a bowl-like configuration and the opened upper edges of the pouch may be rolled downwardly for additional stability. In this open configuration, the pouch bowl will stand upright without assistance from the animal handler. An animal may then drink from the top of the open pouch and a zip closure may be used to save some liquid for later use.

3 Claims, 8 Drawing Sheets

(56) References Cited

U.S. PATENT DOCUMENTS

| | | | | |
|---|---|---|---|---|
| 2005/0281490 | A1* | 12/2005 | Schneider | B65B 9/04 383/61.2 |
| 2006/0182370 | A1* | 8/2006 | Risgalla | B65D 75/5822 383/44 |
| 2007/0269142 | A1* | 11/2007 | Tyska | A01K 7/00 383/38 |
| 2007/0274615 | A1* | 11/2007 | Deniaud | B65D 75/008 383/207 |
| 2008/0138000 | A1* | 6/2008 | Miller | B65D 75/5811 383/208 |
| 2009/0074333 | A1* | 3/2009 | Griebel | B65D 75/5805 383/200 |
| 2010/0142863 | A1* | 6/2010 | Bunge | B65D 75/58 383/207 |
| 2010/0215294 | A1* | 8/2010 | Berman | A61J 11/0095 383/202 |
| 2011/0064338 | A1* | 3/2011 | Surdziel | B65D 75/008 383/207 |
| 2011/0249919 | A1* | 10/2011 | Shepard | B65D 31/10 383/203 |
| 2014/0086513 | A1* | 3/2014 | Menard | B32B 3/10 383/202 |
| 2015/0344187 | A1* | 12/2015 | Sasaki | B65D 75/008 383/202 |

* cited by examiner

PORTABLE LIQUID PACKAGE AND DISPENSING METHOD FOR ANIMALS

CROSS-REFERENCE TO RELATED APPLICATION

This application claims the benefit of utility application Ser. No. 13/441,763 filed Apr. 6, 2012, and provisional application Ser. No. 61/473,465 filed Apr. 8, 2011 which is incorporated herein by reference.

FIELD OF THE INVENTION

The present invention relates to improvements in packaging and serving drinking water and beverages to animals.

BACKGROUND OF THE INVENTION

Animal handlers know that pets and other animals in their care require drinking water at all times, particularly when traveling. Sometimes pets also require water-based liquid beverages having nutrients, minerals, vitamins, electrolytes or the like.

Caring for pets while away from home is a necessary chore that is made more difficult when adequate supplies of fresh water or beverages are unavailable, or when such are difficult to serve to an animal due to lack of suitable and clean receptacles.

Prior art packaging solutions have not afforded the strength, resiliency, content protection, leak-proof requirements and serving options provided by the subject design.

SUMMARY OF THE INVENTION

The present invention is a portable pouch suitable for both transporting and serving water or liquid beverages to animals. The pouch is sealed to contain and protect the liquid contents during transport and storage. The present design is particularly effective for minimizing or eliminating leakage or contamination of the contents. Such sealed pouches can lay in a generally flat configuration for packing, shipping and storage. Preferably a resealable closure such as a zip closure is provided at the top of the pouch for convenience and later reuse.

When the top of the liquid-filled pouch is opened for use, a specially gusseted bottom panel then also opens in a generally round and flat orientation to provide a bowl-like configuration. In this open-mode configuration, the pouch bowl will stand upright without assistance from the animal handler. An animal may then drink from the top of the open pouch and a closure may be used to save some liquid for later use. In preferred embodiments, the upper edge of the pouch bowl may be rolled partially downward, thereby providing additional stability as well as access to the contents.

Sufficiently thick and effective packaging material is required to add stability to the pouch design, so that it can stand up as required, and in order to convert the pouch to its portable serving-bowl configuration. Thermoplastic film laminates used in food and liquid packaging applications may be used in some embodiments of the present design, and preferred laminates are described in detail below. In some other embodiments, aluminum foil may be used in the package, as it also protects minerals vitamins and other nutrients, and may offer a degree of temperature protection. Aluminum or another preferred opaque layer, such as white linear low density polyethylene film, can also provide protection from light damage. A leak-proof closure such as the aforementioned zip closure is used when resealing is desired or required. In such instance, a double seal top is provided, such as an upper notch or tear-cut for initially opening the package and a zip closure for reuse.

Other objects, features and advantages of the present invention will be apparent when the detailed descriptions of the preferred embodiments of the invention are considered with reference to the accompanying drawings, which should be construed in an illustrative and not limiting sense as follows:

BRIEF DESCRIPTION OF THE DRAWINGS

FIGS. 1 and 2 are perspective views of a gusseted pouch.

FIG. 3 is a plan view of a package blank.

FIG. 4 is a plan view of a die line of the pouch prior to filling and sealing.

FIG. 5 is a cross-section of a laminate of packaging material which may be used in the gusseted pouch.

FIGS. 6-8 are perspective views of the packaging system and method in operation.

FIG. 9 is a plan view of a die line of another embodiment of the pouch.

FIG. 10 is a flow chart of the method of providing a liquid beverage to an animal.

DETAILED DESCRIPTION OF THE PREFERRED EMBODIMENTS

Figure 1:
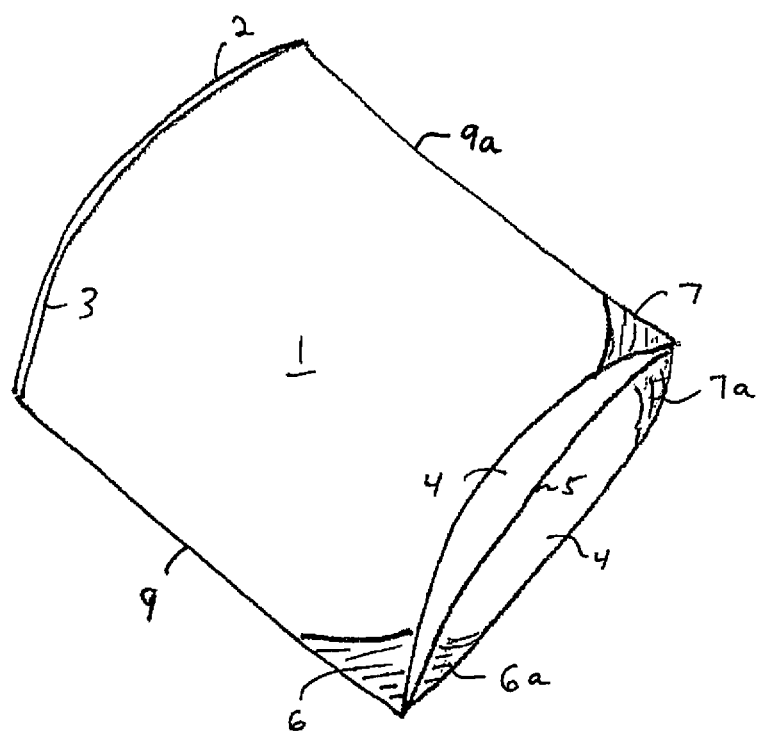
FIGS. 1-10 depict embodiments of the subject packaging designs and method useful in the present invention.

A system for providing liquid products for animal consumption encompasses providing a gusseted pouch made of resilient leak-proof packaging film, the gusseted pouch having a relatively collapsed closed-mode for storing and transporting a liquid product and an upright open-mode for serving the liquid product to an animal. When opened, the gusseted pouch conforms to a bowl-like configuration in its open-mode. The gusseted pouch is formed from a unitary package blank of film packaging material, and the gusseted pouch has an upper edge with at least one opening mechanism, and a pair of sealed opposite parallel pouch side edges. Each side edge adjoins relatively flat front and rear panels, as well as a forward and rear pair of partially sealed lower gusseted panel areas, each lower pair at both opposite lower corners of the gusseted pouch. The lower gusseted opposite panel areas are partially sealed and are thereby configured to enable and facilitate conformance of the package to a bowl-like shape after the gusseted pouch is opened.

The gusseted pouch has a unitary bottom gusset panel which provides a lower front edge to a vertically oriented pouch, an inner bottom panel which is folded up in the closed-mode pouch condition and an opposite rear lower bottom edge generally parallel to the front lower edge of the pouch, and which bottom panel readily opens to a bowl-like configuration when the product is opened to a liquid product serving mode.

The system provides for filling the gusseted pouch with a liquid product and sealing the gusseted pouch to provide a filled package in its closed-mode. The system also provides for transporting a filled and sealed gusseted pouch in a collapsed closed-mode thereby providing a portable and storable liquid product for animals. The system and method further comprises a consumer opening the gusseted pouch providing access to liquid contents therein, forming the opened gusseted pouch into its open bowl-like configuration for serving the liquid product therein, and serving the liquid product to an animal.

The gusseted pouch may also include at least one opening mechanism such as a hand-operable tear notch or tear strip. Preferred packaging will also include a resealable closure such as a zip closure. Preferred gusseted pouches may also have an additional collar portion which may be folded downward upon the sides of an open gusseted pouch to further facilitate and stabilize its bowl-like shape when serving liquid products to animals. The collar operates by folding down a portion of the upper edge of the gusseted pouch to form a reinforcing collar for conformance to a bowl-like configuration when the gusseted pouch is in its open-mode. In preferred embodiments, the opposite parallel pouch edges are generally shorter than the horizontal width of the package in order to form a more convenient and comfortable bowl-like configuration. That is to say shorter, wider pouches are typically preferred for use in the subject method providing a water bowl or dish.

Many packaging materials may be chosen as product requirements dictate, however, a preferred package blank is made of a multilayered packaging film having a polyamide resin (nylon) layer laminated between an outer polyethylene terephthalate film layer and a linear low density polyethylene (LLDPE) film liquid contact inner layer. White LLDPE is preferred as it is opaque, thereby providing additional protection for the pouch contents. Packages made of the foregoing design will include those having liquid contents, such as water, for animal consumption. Other embodiments may utilize aluminum foil as the opaque layer.

Figure 2:
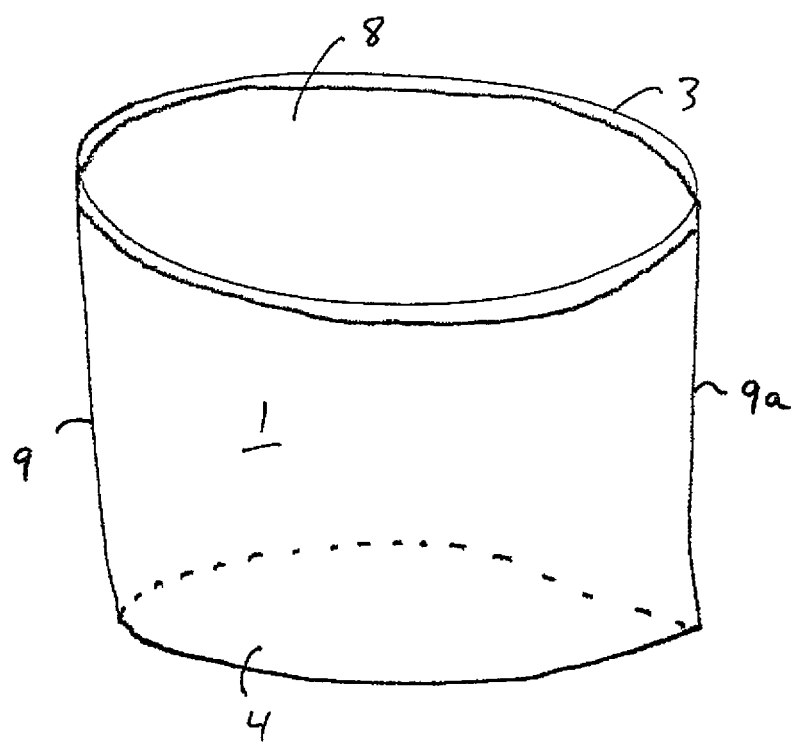

FIG. 1 is a perspective view of a portable pouch 1 containing water or liquid beverages suitable for animal care. In this view, the pouch is sealed along upper edge 2 to contain the liquid during transport. During transport and storage such sealed pouches are in a closed mode and lay in a generally flat configuration. Filled pouches may be cut open for use but preferably, an easy opening tear strip will be provided. A resealable closure 3, such as a zip closure is provided at the top of the pouch for later reuse. Conventional double hook zip closures may be utilized, and applied with laser scoring of the pouch blank. Bottom panel 4 is generally divided in half by bottom gusset fold line 5. Bottom panel 4 has opposite partially sealed front gusset panels 6 and 7 and complementary rear sealed gusset panels 6a and 7a. These gusset panels are partially sealed to facilitate the bowl shape of the package in its open-mode configuration. Partial sealing, which may be physical or with adhesives, refers to affixing adjacent gusset panel areas at the lower front and rear corners of the pouch, to facilitate formation of the bowl-like configuration the pouch attains in its open-mode. The sealing locations will be seen in greater detail in FIG. 3. Opposite edges 9 and 9a seen in FIG. 1 may also be referred to as vertical edges, as seen in FIG. 2, when the package is in its open-mode, which is its upright service conformation. Preferably edges of the pouch will be thermosealed but other techniques including sonic welding may be utilized.

FIG. 2 depicts an opened pouch 1 where the gusseted bottom panel 4 lies relatively flat under the weight of the liquid contents of the pouch. Bottom panel 4 has opened to a generally round configuration to provide a bowl-like configuration. An animal may access drinking area 8 from the top of the open pouch and a resealable closure 3 may be used to save some liquid for later use. Opposite vertical edges 9 and 9a are also depicted. The pouch is made of materials and in sizes described below which offer strength and resiliency to facilitate an upright, free-standing bowl configuration which does not need to be held for the animal to drink from it.

Figure 3:
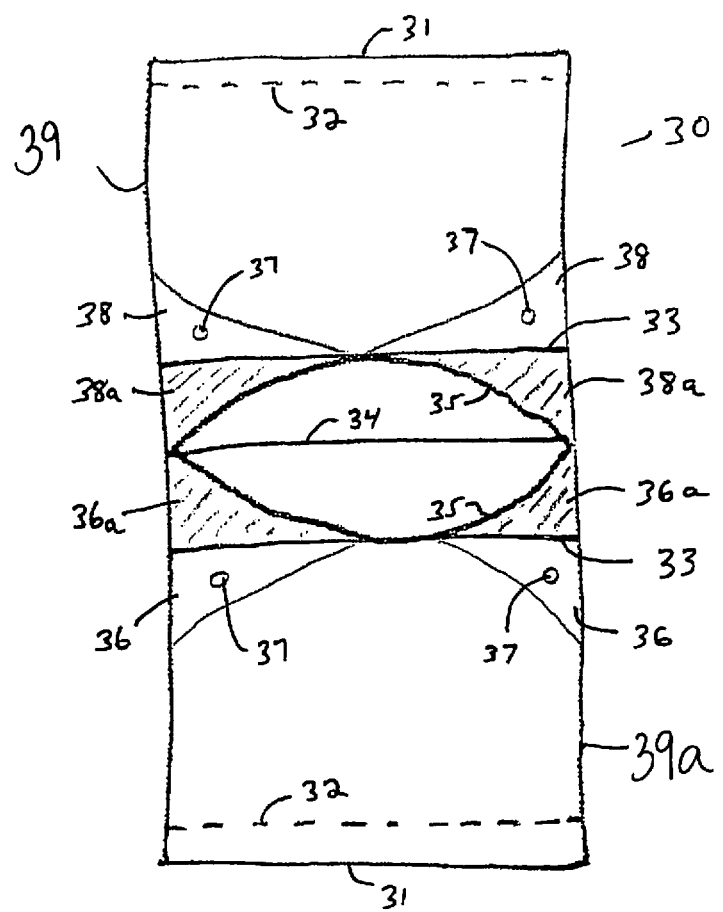

FIG. 3 depicts a unitary package blank 30 of packaging material suitable for use in the subject gusseted pouch. Typically a single blank may be cut from a continuous web of packaging film. Blank 30 is depicted laying flat before being folded, formed and sealed. Folds, scores, and imprint lines may be provided by conventional packaging equipment. Regular and reusable seals are provided. It may be seen in FIG. 3 that blank 30 is symmetrical. It has opposite edges 31 which will be the top edges of a formed pouch. The package blank also depicts resealable closure 32, front and rear pouch bottom edges 33, bottom gusset fold 34 which divides the bottom panel into opposite sides or halves 34a and 34b, score or imprint lines 35 which in this embodiment are rounded to assist the pouch to attain its bowl-like configuration in its open-mode. Variations of these features are permissible. In a gusseted pouch which can be formed hereunder, the bottom area of the pouch has several complementary corner-areas which may be partially sealed or adhered together to facilitate the bowl-like configuration when the gusseted pouch is in its open-mode. These are referred to as partially sealed areas because the seals are adjusted to provide or facilitate a desired bowl-like configuration for open packages. Looking at the package blank 30 in FIG. 3, the areas that will be partially sealed or adhered together for this purpose are area 36 with area 36a and area 38 with area 38a on the left side of blank 30. Since the blank is symmetrical, these complementary seal areas appear on the right side as well. Void areas 37 are utilized when adhesive resin seals are utilized, to make room for movement of excess sealant during the sealing process. Thermosealing techniques may also be used as may be required in certain applications. The pouch may be formed on forming equipment in the following manner. Bottom gusset fold 34 rises and folds together opposite bottom panel sides 34a and 34b. As upper pouch edges 31 are brought together, partially sealed bottom gusset corner areas 36 and 36a are brought together and sealed or adhered while on the other side of the pouch partial seal areas 38 and 38a are likewise sealed or adhered. Side edge seals 39 and 39a are also added at this time in a conventional manner. Sealing techniques and materials may be varied as required and may include thermosealing, spot or weld tacking or plastic or resin adhesive material or the like.

In a typical embodiment of the subject package design, a package blank as depicted in FIG. 3 may have a length of 20 inches and a width of 8 inches. This size blank allows for a two inch bottom panel gusset fold and another inch at the opposite or upper edge of the package for an easy opening mechanism such as a tear strip and a resealing mechanism such as a zip closure. Other variations in blank sizes will provide a variety of sizes of liquid pouches as may be desired for additional embodiments of the subject stand-up beverage pouches. Preferred pouches will typically have a wider rather than taller profile after forming, thereby offering a more convenient serving bowl configuration.

Figure 4:
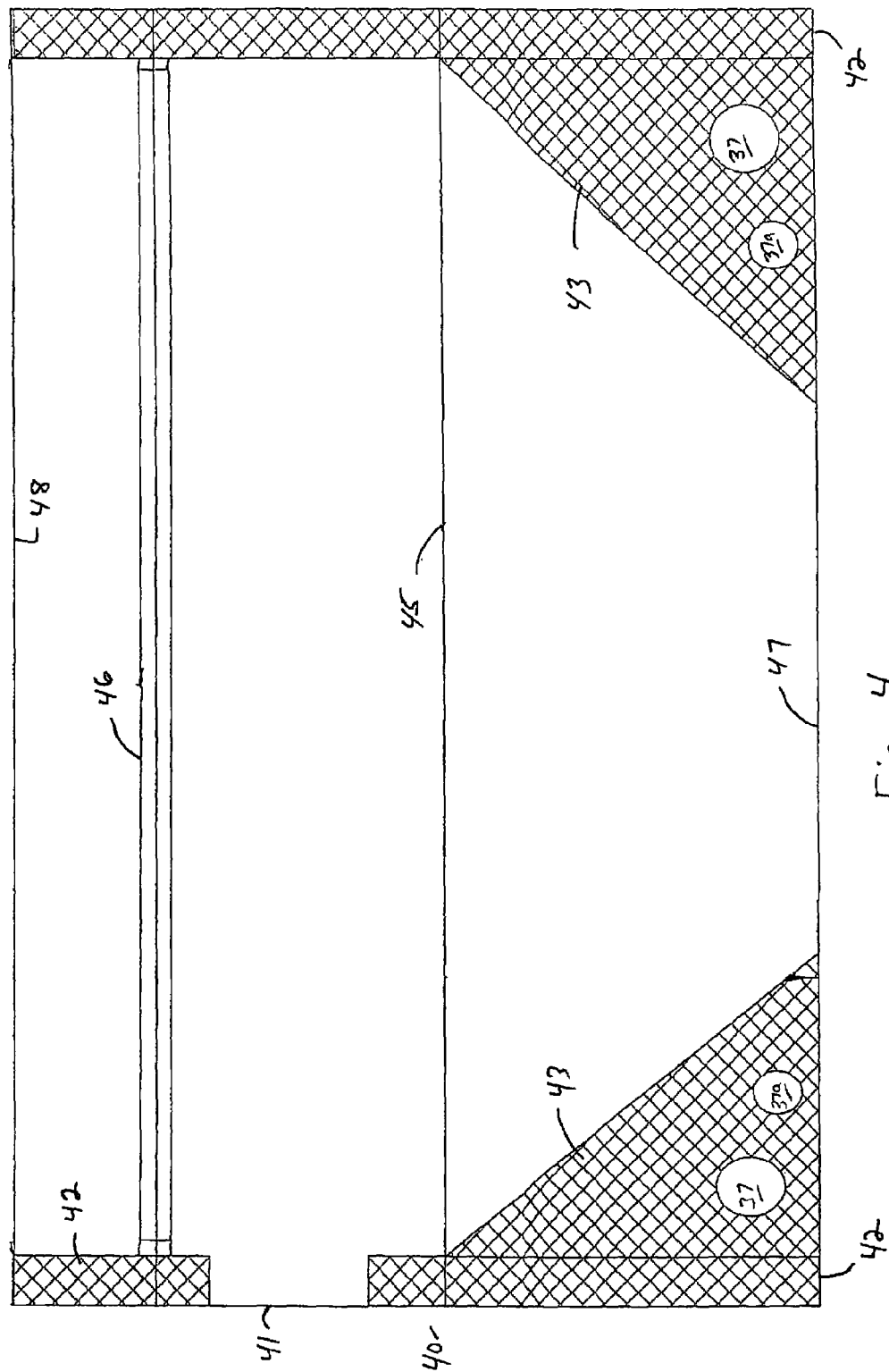

FIG. 4 depicts an embodiment of a pouch 40 suitable for transporting and serving pet water and beverages. Liquid content filling hole 41 is provided on the side in this figure, but may appear on any other edge or surface of the packaging as conventional forming, filling and sealing equipment may require. In other embodiments, top-filling and sealing techniques may be utilized. FIG. 4 additionally depicts side-seal areas 42 as well as adhesive expansion areas 37 and 37a where the partially sealed bottom gusset corners 43 are formed. Also seen in this figure is bottom gusset fold line 45 in its folded closed-mode position, re-sealable closure 46, pouch top edge 48 and pouch bottom edge 47. In typical consumer applications, pouches will be designed to hold and serve about 0.25 to 1.0 liter portions, but other volumes are also acceptable.

Figure 5:
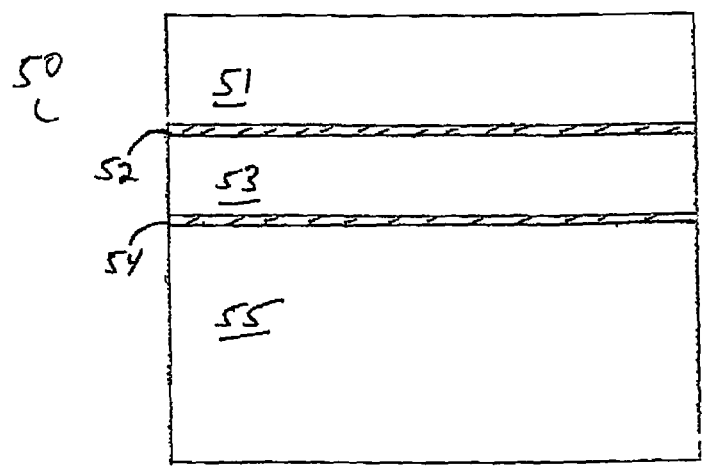

FIG. 5 is a cross-sectional representation of a web of packaging material 50 suitable for use in the subject pouch design. In a preferred embodiment, a 48 gauge polyethylene terephthalate (PET) polyester film 51 is laminated with 60 gauge nylon 53 and 340 gauge linear low density polyethylene (LLDPE) film 55. Adhesive layers 52 and 54 are provided by conventional laminating equipment used for this application. Conventional lamination adhesives are available from Elmer's Products, Inc. In this embodiment, the PET layer is printable and the LLDPE is the liquid content layer. However, it will be recognized that many other methods of printing or labeling products may be utilized, including the use of printed paper labels.

Figure 6:
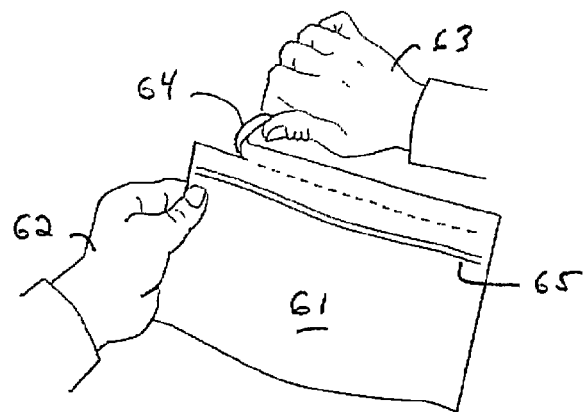
Figure 7:
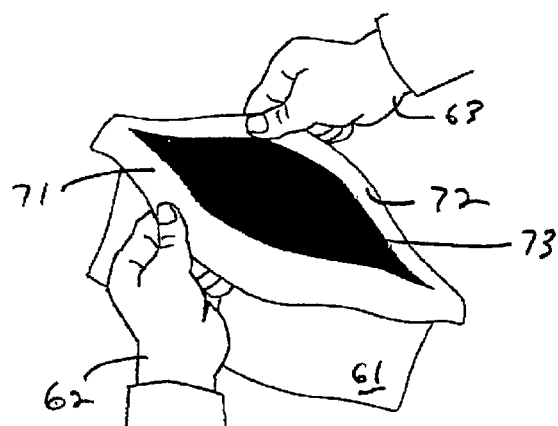
Figure 8:
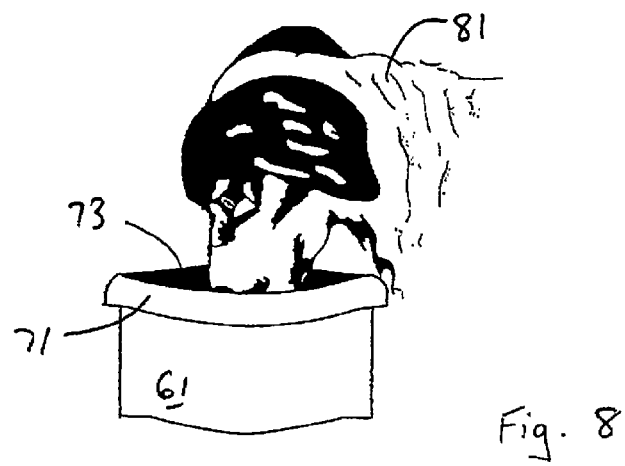

FIGS. 6 to 8 depict a method for opening, forming and using an embodiment of the subject design, which in these figures is package 61. In FIG. 6, a consumer holds package 61 in left-hand 62 while right-hand 63 grasps easy opening package edge 64 and begins opening the package by tearing away the sealed upper edge of the pouch. Also seen in FIG. 6 is package resealing means 65. It should be noted that a user may just as easily hold and open the package 61 in opposite fashion.

In FIG. 7, opposite hands 62 and 63 manually pull open and fold over collar edges 71 and 72 on opposite sides of package 61. In this embodiment, the package is opened and formed into its bowl-like configuration by pulling down the package collar portion, thereby stabilizing the pouch while providing access to contents 73 of package 61.

FIG. 8 is an embodiment depicting package 61 in its open configuration having a bowl-like shape reinforced by collar 71, and thereby providing convenient access to the package contents 73 for an animal, which in this case is dog 81.

It will be recognized that the package may be provided in a variety of lengths and widths so that different package configurations may be offered to consumers having animals with differing sizes or needs.

Figure 9:
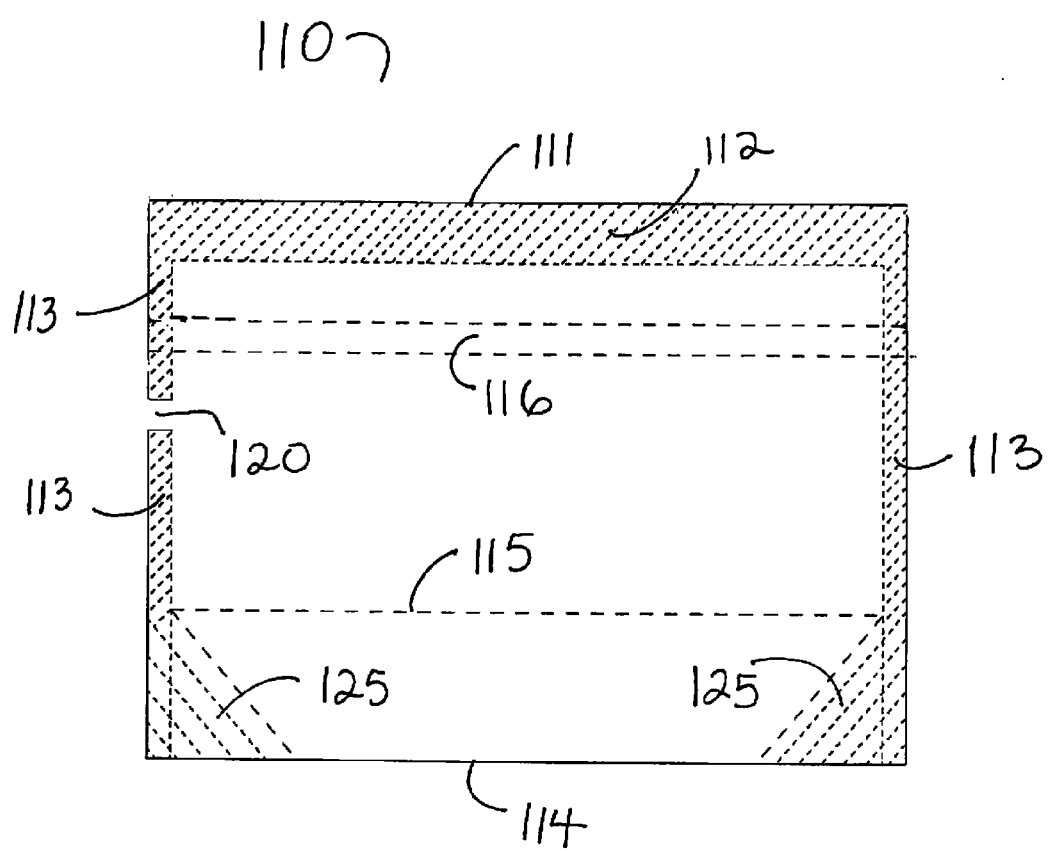

It will also be recognized that a variety of patterns for sealing the package may be used as illustrated by the alternative package blank 110 shown in FIG. 9. In this embodiment, similar to the embodiment of FIG. 4, the package has bottom edge 114, gusset fold 115, resealable closure 116, top edge 111 and side edges 113. In this embodiment, the top edge may have a wider area of adhesive seal 112 similar to the seal provided along the side edges 113. Also, the liquid content filling hole 120 is depicted as smaller in this embodiment relative to its depiction in other embodiments. It will be recognized that the size of the filling hole may vary relative to the size of the package as may be necessary to accommodate a variety of manufacturing and filling machinery or processes. Again, it is preferred to utilize partially sealed bottom gusset corners 125 to facilitate the pouch's conformation to its open bowl-like configuration.

The dimensions of the package may vary without departing from the scope of the invention, though it is preferred to have the length of the pouch (along bottom edge 114) be greater than the height of the pouch (along side edges 113). In a typical embodiment, the pouch will be 254 mm long and 186 mm tall. The side edge area where the package is heat-sealed, illustrated in FIG. 9 as areas 113, will preferably be about 10 mm wide. Approximately 10 mm below the zip closure 116, on one side is the liquid content filling hole, which is preferably 10 mm wide. The zip closure is preferably 15 mm wide. The space between the zip closure 116 and the heat-sealed top edge 112 is preferably about 10 mm, which allows the package to be opened when the heat-sealed top edge is torn away. The partially sealed bottom gusset corners 125 preferably extend 50 mm from the corner of the backage.

Using an optional resealing mechanism such as a zip closure, the subject package may be reused numerous times until its contents are finished and it may then be readily disposed. It will be seen that resealing and leak resistance are notable features of the present design.

As discussed previously, a variety of commercially available leakproof films may be chosen for use with the present packaging design. Normally factors which will be used to select such film material will be reliability and durability, a non-toxic product contact surface, satisfactory shelf-life expectation and prevention of deterioration of the package contents due to contamination, sunlight, oxygen migration, or the like. The package designer will select the packaging material with the foregoing criteria in mind.

An example of packaging film useful in the subject design is a multi-laminated film layered as follows: an outer layer of 48 gauge polyethylene terephthalate film (which may have a printable ink surface for labeling if desired), an adhesive such as conventional laminating adhesive resin, a 60 gauge polyamide resin layer, another adhesive layer and an interior 340 gauge film of white linear low density polyethylene film. This structure is commercially available for packaging of hot and cold materials and it has excellent hot tack and seal strength. A laminate of these components having the indicated thickness will thus have a total thickness of about 4.5 mil, but this may be varied as required within reasonable limits, e.g. 2.0 to 6.0 mils, reflecting both durability and ease in handling the material.

In embodiments utilizing barrier layers, the package has excellent oxygen and moisture barrier properties.

Figure 10:
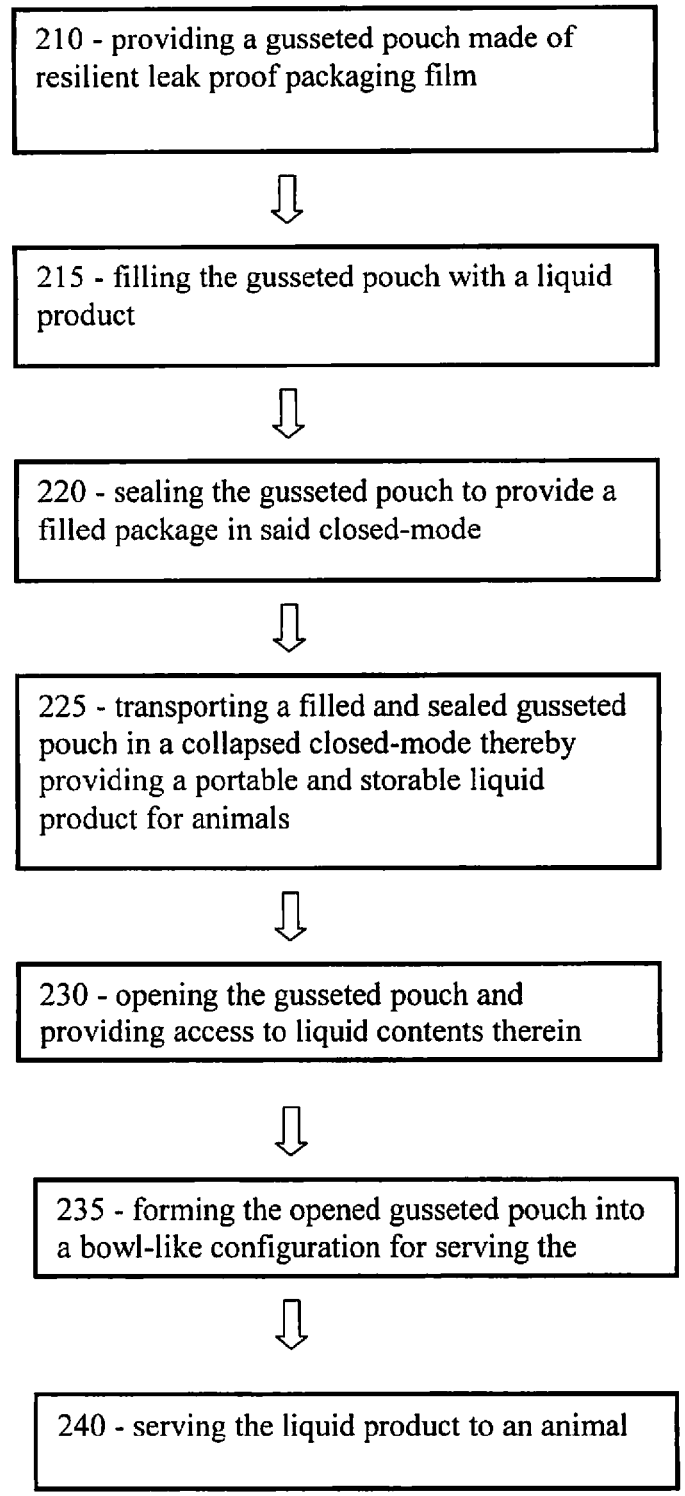

As described in FIG. 10, the system for providing liquid products for animal consumption comprises providing a gusseted pouch made of resilient leak proof packaging film 210, the gusseted pouch having a relatively collapsed closed-mode for storing and transporting a liquid product and an upright open-mode for serving the liquid product to an animal, whereby the open gusseted pouch conforms to a bowl-like configuration in the open mode; wherein the gusseted pouch is formed from a unitary package blank of film packaging material, and whereby said gusseted pouch comprises an upper edge having at least one opening mechanism, a pair of sealed opposite parallel pouch side edges, each side edge adjoining a forward and rear pair of partially sealed lower gusseted panel areas at both opposite lower corners of the gusseted pouch, wherein the partially sealed lower gusseted opposite panel areas are configured to facilitate conformance to a bowl-like shape after the gusseted pouch is opened; the gusseted pouch having a unitary bottom gusset panel which provides a lower front edge to a vertically oriented pouch, an inner bottom panel which is folded up in the closed-mode pouch condition and an opposite rear lower bottom edge generally parallel to said front lower edge, and which bottom panel readily opens to a bowl-like configuration when the product is opened to a liquid product serving mode; filling the gusseted pouch with a liquid product 215; and sealing the gusseted pouch to provide a filled package in said closed-mode 220.

The system may further comprising the steps of transporting a filled and sealed gusseted pouch in a collapsed closed-mode thereby providing a portable and storable liquid product for animals 225; the steps of opening the gusseted pouch and providing access to liquid contents therein 230; forming the opened gusseted pouch into a bowl-like configuration for serving the liquid product therein 235; and serving the liquid product to an animal 240. Although optional, it is frequently preferred to utilize a resealable closure so that remaining liquid contents may be re-served at a later time.

The at least one opening mechanism may be a hand-operable tear strip. The at least one opening mechanism may be a resealable closure, such as a zip closure.

The gusseted pouch may have an additional collar portion which may be folded down upon the sides of an open gusseted pouch to further facilitate its bowl-like shape when serving liquid products to animals.

The system may then have the further step of folding down a portion of the upper edge of the gusseted pouch to form a collar for reinforcing conformance to a bowl-like configuration when the gusseted pouch is in its open-mode.

It is preferred that the opposite parallel pouch edges are generally shorter than the horizontal width of the package in order to form a more comfortable bowl-like configuration. It is also preferred that the package blank is comprised of a multilayered packaging film having an aluminum foil layer laminated between an outer polyethylene terephthalate film layer and a linear low density polyethylene film liquid contact inner layer.

The foregoing method may be practiced with a package for providing liquid products for animal consumption which preferably comprises a gusseted pouch made of resilient leak proof packaging film, the gusseted pouch having a relatively collapsed closed-mode for storing and transporting a liquid product and an upright open-mode for serving the liquid product to an animal, whereby the open gusseted pouch conforms to a bowl-like configuration in the open-mode; wherein the gusseted pouch is formed from a unitary package blank of film packaging material, and whereby the gusseted pouch comprises an upper edge having at least one opening mechanism, a pair of sealed opposite parallel pouch side edges, each side edge adjoining a forward and rear pair of partially sealed lower gusseted panel areas at both opposite lower corners of the gusseted pouch, wherein the partially sealed lower gusseted opposite panel areas are configured to facilitate conformance to a bowl-like shape after the gusseted pouch is opened; the gusseted pouch having a unitary bottom gusset panel which provides a lower front edge to a vertically oriented pouch, an inner bottom panel which is folded up in the closed-mode pouch condition and an opposite rear lower bottom edge generally parallel to the front lower edge, and which bottom panel readily opens to a bowl-like configuration when the product is opened to its liquid product serving mode.

A preferred package may have a hand-operable tear strip, a resealable closure such as a zip closure, and an additional collar portion which may be folded down upon the sides of an open gusseted pouch to further facilitate its bowl-like shape when serving liquid products to animals. The preferred package has opposite parallel pouch edges that are generally shorter than the horizontal width of the package in order to form a more comfortable bowl-like configuration.

The preferred package is comprised of a multilayered packaging film having polyamide or aluminum foil layer laminated between an outer polyethylene terephthalate film layer and an inner linear low density polyethylene film liquid contact layer. In practice, the package will be filled with a liquid product, usually water. Suitable liquid packaging materials and converting machinery are available from a number of sources including Performance Packaging of Nevada LLC (www.PPLV.co) and U.S. Plastic Corp of Lima Ohio (www.usplastic.com).

EXAMPLE: A thermoplastic liquid packaging film was provided having an upper printable 48 gauge polyethylene terephthalate layer adhesively laminated to a 60 gauge polyamide resin layer which in turn was adhesively laminated to a 340 gauge layer of white linear low density polyethylene resin, thereby providing a packaging film of about 4.48 mil. A 20 inch by 10 inch pouch blank was scored and died to provide a partially gusseted pouch having an upper tear notch and a resealable zip closure. The unfilled pouch was substantially thermosealed along its outer edges, except for a nipple filling opening required for subsequent filling, thereby providing a relatively flat gusseted pouch ready for filling with liquid contents. The pouch was filled with 16 ounces of purified water and thereafter transported to determine the resilience of the packaging. Subsequently, the pouch was opened, the gusseted bottom flattened out into a open bowl-like configuration and the upper edges of the opened pouch were rolled downwardly to provide a collar to stabilize the structure and provide ready access to its liquid contents.

The invention now being fully described, it will be apparent to one of ordinary skill in the art that many changes and modifications can be made thereto without departing from the spirit or scope of the invention as set forth herein.

The invention claimed is:

1. A method for providing liquid products for animal consumption comprising:

providing a gusseted pouch made of resilient leak proof packaging film, said gusseted pouch having a relatively collapsed closed-mode for storing and transporting a liquid product and an upright open-mode for serving the liquid product to an animal, whereby the open gusseted pouch conforms to a bowl shape in said open mode;

wherein said gusseted pouch is formed from a unitary package blank of liquid packaging film material, and whereby said gusseted pouch comprises an upper edge having at least one opening mechanism, a pair of sealed opposite parallel pouch side edges, each side edge adjoining a forward and rear pair of partially sealed lower gusseted panel areas at both opposite lower corners of the gusseted pouch, wherein said partially sealed lower gusseted opposite panel areas are configured to facilitate conformance to a bowl shape after the gusseted pouch is opened;

said gusseted pouch having a unitary bottom gusset panel which provides a lower front edge to a vertically oriented pouch, an inner bottom panel which is folded up in the closed-mode pouch condition and an opposite rear lower bottom edge generally parallel to said front lower edge, and which bottom panel readily opens to a bowl shape configuration when the product is opened to a liquid product serving mode, wherein the gusseted pouch has a collar portion which may be folded downwardly upon the sides of an open gusseted pouch to further facilitate and stabilize a bowl shape when serving liquid products to animals;

filling the gusseted pouch with a liquid product;

sealing the gusseted pouch to provide a filled package in said closed-mode;

transporting a filled and sealed gusseted pouch in a collapsed closed-mode thereby providing a portable and storable liquid product for animals;

opening the gusseted pouch and providing access to liquid contents therein;

forming the opened gusseted pouch into a bowl shape for serving the liquid product therein; and folding downwardly said collar portion of the open gusseted pouch to reinforce conformance to a bowl shape when the gusseted pouch is in its open-mode.

2. The method of claim 1, further comprising the step of:

serving the liquid product to an animal.

3. The method of claim 1, further comprising the step of resealing the open pouch.

\* \* \* \* \*